United States Patent
Au

(10) Patent No.: US 6,726,892 B1
(45) Date of Patent: Apr. 27, 2004

(54) ADVANCED ALUMINUM ALLOYS FOR HYDROGEN STORAGE

(75) Inventor: Ming Au, Irvine, CA (US)

(73) Assignee: Quantum Fuel Systems Technologies Worldwide, Inc., Irvine, CA (US)

(*) Notice: Subject to any disclaimer, the term of this patent is extended or adjusted under 35 U.S.C. 154(b) by 0 days.

(21) Appl. No.: 10/076,026

(22) Filed: Feb. 12, 2002

(Under 37 CFR 1.47)

Related U.S. Application Data

(60) Provisional application No. 60/268,887, filed on Feb. 14, 2001.

(51) Int. Cl.$^7$ .............................. C01B 6/24; C01B 6/26
(52) U.S. Cl. ..................... 423/644; 75/352; 420/400; 420/407; 420/422; 420/542; 420/900; 252/188.25
(58) Field of Search .......................... 75/351, 352, 354; 420/400, 407, 422, 542, 590, 900; 423/644, 645, 646, 647, 658.2; 252/188.25

(56) References Cited

U.S. PATENT DOCUMENTS

| | | | | |
|---|---|---|---|---|
| 4,961,779 A | * | 10/1990 | Kusui et al. | ................. 75/231 |
| 6,106,801 A | * | 8/2000 | Bogdanovic et al. | .... 423/648.1 |

FOREIGN PATENT DOCUMENTS

| | | | | |
|---|---|---|---|---|
| WO | WO 97/03919 | * | 2/1997 | ............ C01B/3/00 |

* cited by examiner

*Primary Examiner*—Stanley S. Silverman
*Assistant Examiner*—Maribel Medina
(74) *Attorney, Agent, or Firm*—Morrison & Foerster LLP

(57) ABSTRACT

Various aspects of the present invention provides a nanocrystalline powder suitable for storing hydrogen and a method of producing such a powder. One embodiment provides a nanocrystalline powder containing crystals of an aluminum alloy selected from the group consisting of $NaAl_x$, $LiAl_x$, and $MgAl_{2x}$, wherein x is between 0.9 and 1.1, desirably 0.95–1.05, preferably about 1. The nanocrystalline powder also desirably includes an intercalated catalyst selected from the group consisting of C, Ti, Pt, Pd, V, Zr, and combinations of two or more of those materials.

28 Claims, No Drawings

ADVANCED ALUMINUM ALLOYS FOR HYDROGEN STORAGE

CROSS REFERENCE TO RELATED APPLICATIONS

This application claims the benefit of Provisional Application No. 60/268,887 filed Feb. 14, 2001.

TECHNICAL FIELD

The present invention generally relates to metal alloys useful for storing hydrogen. More specifically, the invention provides aluminum alloys particularly well suited for hydrogen storage and methods of producing the same.

BACKGROUND

Petroleum fuels are currently the primary fuels for operating internal combustion engines and turbines in vehicles, generators and many other applications. Gasoline and diesel, for example, are currently the most popular fuels for operating cars, trucks, machinery and other motorized equipment. It is estimated that the transportation sector consumes nearly 50% of the total petroleum fuels consumed in the United States. One problem of using petroleum fuels is that they produce a significant amount of air pollution. Another serious problem of using petroleum fuels is that the United States and other industrialized countries import more than 50% of the oil that they consume. As a result, the economies and the national security of many industrialized countries are susceptible to production controls and foreign policy concerns of foreign petroleum producing countries. Therefore, it is well recognized that there is a high demand for systems that can generate, distribute and use abundant and clean transportation fuels.

Hydrogen is one of the most promising fuels that is being considered to replace petroleum fuels for the transportation sector. In the case of vehicles, hydrogen fuel-cells that generate electricity from a flow of hydrogen are being used to power electric automobile engines, and combustion engines that burn hydrogen are being used in other applications. One advantage of using hydrogen is that it does do not produce air pollution. An advantage of using hydrogen fuel-cells is that vehicles will not need to carry large, heavy batteries to store electrical power because the hydrogen fuel-cells provide a power plant onboard the vehicles. As a result, electrical vehicles with hydrogen fuel-cells are expected to be lighter and more efficient than existing battery-powered electrical vehicles. Hydrogen fuels also provide more energy than either gasoline or natural gas on a per-weight basis, and hydrogen is also readily abundant from resources within the borders of the United States and other industrialized countries. Hydrogen fuels may accordingly reduce the economic and foreign policy concerns caused by importing a significant percentage of the petroleum fuels. Therefore, it would be very beneficial to replace gasoline and diesel with hydrogen as a viable fuel for the transportation sector.

The implementation of a national energy economy based on hydrogen fuels will require the development of many systems and processes to make hydrogen fuels as safe and convenient to use as gasoline or diesel. One area of hydrogen fuel technology that needs further development is storing hydrogen in a safe, efficient manner. Although hydrogen has more energy than gasoline on a per-weight basis, it has a much lower energy/unit volume than gasoline. As a result, conventional hydrogen storage systems require a much larger storage vessel than gasoline tanks to provide the same vehicle operating range, for example. The United States Department of Energy has established energy density goals for storing hydrogen onboard vehicles at 6.5 weight percent $H_2$ and 62 kg $H_2/m^3$. Existing storage systems for compressed or liquefied hydrogen are generally high-pressure storage vessels with a vacant cavity that can hold approximately 6.7 weight percent $H_2$ and 20 kg $H_2/m^3$ at a pressure of 5000 psi, falling short of the desired density.

Gas-on-solid adsorption offers the possibility of a more dense storage medium than would be achieved utilizing hydrogen alone. While a number of materials have been suggested as viable solid media, more research has probably been done on metal hydrides than most other potential gas-on-solid hydrogen storage media. A number of metal alloys are known to be able to reversibly absorb and release hydrogen. For example, FeTi, $LaNi_5$, $Mg_2Ni$ and pure magnesium have all been investigated as hydrogen storage media.

Many of these hydridable metals have some disadvantages, though. For example, FeTi and $LaNi_5$ both have typical hydrogen storage capacities of less than two weight percent hydrogen. $Mg_2Ni$ is better, with hydrogen storage capacities of as high as 3.8 weight percent, but this alloy still falls short of the 6.5 weight percent target. Magnesium seems like an excellent candidate in that it has a nominal hydrogen storage capacity of 7.6 weight percent. Unfortunately, though, magnesium oxidizes vary easily. A skin of magnesium oxide tends to form on the metal particles, effectively preventing the particles from absorbing hydrogen except under very high pressures and temperatures.

Another class of metal hydrides that shows significant promise is a class of alloys referred to as "alanates." Alanates are all hydridable aluminum alloys and include NaAl, LiAl, $MgAl_2$ and $ZrAl_2$. Each of these alloys has rather high theoretical hydrogen storage capacities—$NaAlH_4$ can theoretically hold 5.6 weight percent hydrogen and 56 Kg $H_2/m^3$; $Mg(AlH_4)_2$ has a potential of storing 6.95 weight percent hydrogen at densities of 70 Kg $H_2/m^3$; and $LiAlH_4$ may store as much as 7.9 weight percent hydrogen at densities of 79 Kg $H_2/m^3$. The storage capacity of NaAl approaches the U.S. Department of Energy goal while $MgAl_2$ and LiAl both exceed the goal.

Unfortunately, all three of these compounds have relatively slow reaction kinetics for absorbing and desorbing hydrogen. As a consequence, relatively high operating temperatures and pressures are necessary and it takes unduly long for these materials to take up and release significant quantities of hydrogen.

SUMMARY OF THE INVENTION

Various aspects of the present invention provides a nanocrystalline powder suitable for storing hydrogen and a method of producing such a powder. One embodiment of the invention provides a nanocrystalline powder which comprises polycrystalline particles containing crystals of an aluminum alloy selected from the group consisting of $NaAl_x$, $LiAl_x$, $MgAl_{2x}$, and $ZrAl_{2x}$, wherein x is between 0.9 and 1.1, desirably 0.95–1.05, preferably about 1. The nanocrystalline powder also estimably includes an extracrystalline catalyst present on and in the polycrystalline particles. The catalyst may be selected from the group consisting of carbon, titanium, platinum, palladium, vanadium, zirconium, cobalt, nickel, iron, lanthanum, and combinations of two or more of carbon, titanium, platinum, palladium, vanadium, zirconium, cobalt, nickel, iron, and lanthanum. The aluminum alloy crystals desirably have a grain size of no more than 100 nm. The catalyst may be intercalated between the crystals of the polycrystalline particles to further facilitate hydrogen uptake and release.

In accordance with another embodiment, the present invention provides a method of forming a hydrogen storage medium. In accordance with one aspect of this invention, a charge is provided, with the charge comprising powdered aluminum and a powder of a second metal in a predetermined atomic ratio. The second metal is selected from the group consisting of lithium; sodium; magnesium; zirconium; alloys of two or more of lithium, sodium, magnesium, and zirconium; and a mechanical mixture of two or more of lithium, sodium, magnesium, and zirconium. This charge is milled, such as by impact milling in a ball mill, to create a nanocrystalline alloy powder comprising crystals of $MAl_x$, wherein x may be close to 1 for each atom of M which is lithium or sodium and x may be close to 2 for each atom of M which is magnesium. In a further embodiment of the method, a catalyst is intercalated on and into particles of the alloy powder. The intercalated catalyst is selected from the group consisting of carbon, titanium, platinum, palladium, vanadium, zirconium, cobalt, nickel, iron, lanthanum, and combinations of two or more of carbon, titanium, platinum, palladium, vanadium, zirconium, cobalt, nickel, iron, and lanthanum. The catalyst can be intercalated by milling the nanocrystalline alloy powder with a powder comprising the catalyst. The catalyst powder may comprise a fullerene structure consisting essentially of carbon.

Another embodiment of the invention provides a metal suitable for reversibly storing hydrogen. The metal may have the formula $MAl_{x-y}M'_y$ and can form a hydride having the formula $MAl_{x-y}M'_yH_4$. In these formulae:

M comprises a metal selected from the group consisting of sodium, lithium, magnesium, and zirconium;

M' comprises an element selected from the group consisting of silicon, potassium, calcium, barium, titanium, lithium, sodium, magnesium, and zirconium;

x is between 0.9 and 1.1 if M is sodium or lithium and x is between 1.8 and 2.2 if M is magnesium or zirconium; and y is between 0.1 and 0.5.

In still another embodiment, the invention provides a metal hydride which is suitable for reversibly storing hydrogen and which may have the formula $M_{1-y}M'_yAl_x$. This metal may form a hydride of the formula $M_{1-y}M'_yAl_xH_4$. In these formulae:

M comprises a metal selected from the group consisting of sodium, lithium, magnesium, and zirconium;

M' comprises an element selected from the group consisting of silicon, potassium, calcium, barium, titanium, lithium, sodium, magnesium, and zirconium;

x is between 0.9 and 1.1 if M is sodium or lithium and x is between 1.8 and 2.2 if M is magnesium or zirconium; and y is between 0.1 and 0.5.

DETAILED DESCRIPTION

The present invention contemplates a number of different aluminum-based alloy materials which show significant promise as hydrogen storage media. In accordance with a first of these embodiments, the aluminum alloy takes the form of a nanocrystalline powder comprising polycrystalline particles. The particles should be small to enhance the surface area of the powder and minimize the distance that hydrogen has to diffuse into the particle to achieve full hydrogen storage capacity.

The particles desirably have an average size of no more than about one micron and preferably have average size of no greater than about 100 nm. It should be recognized that at such particle sizes, the individual particles may form larger agglomerates which exceed this 100 nm size. Each particle may consist of one or more grains having an average size of 1–100 nm, more preferably 3–50 nm. As a consequence, most of the particles will be polycrystalline, i.e., will comprise more than one crystal.

At least a majority, and desirably substantially all, of the crystals in the nanocrystalline powder comprise an alloy of aluminum and sodium, lithium, magnesium, or zirconium. More particularly, the alloy is desirably of the formula $NaAl_x$, $LiAl_x$, $MgAl_{2x}$, or $ZrAl_{2x}$, where x is a number between 0.9 and 1.1. Desirably, x in these formulae is between 0.95 and 1.05, and may be equal to 1 in accordance with one particular embodiment.

In this embodiment of the invention, the nanocrystalline powder may further comprise a catalyst. The catalyst should facilitate formation of the hydride at a lower temperature and pressure than may otherwise be necessary. The catalyst may also permit release of the hydrogen at lower temperatures and pressures than may otherwise be necessary. The catalyst may be selected from the group consisting of carbon, titanium, platinum, palladium, vanadium, zirconium, cobalt, nickel, iron, lanthanum, and combinations of two or more of carbon, titanium, platinum, palladium, vanadium, zirconium, cobalt, nickel, iron, and lanthanum.

Of these catalysts, carbon is particularly promising in that carbon can also be used as a hydrogen storage medium in its own right. If so desired, the catalyst may comprise a fullerene structure consisting essentially of carbon. Fullerenes are carbon molecules in which carbon atoms are arranged in a regular lattice structure to form a three-dimensional structure. More specifically, the carbon atoms are usually arranged in a series of regular hexagons, though sometimes pentagons or even heptagons may be incorporated into their structure to yield different tree-dimensional shapes. These structures include spherical $C_{60}$ and even $C_{70}$ spheres, often referred to as "buckminsterfullerene" or "buckyballs." Fullerenes can also be formed into tubular structures, commonly referred to as "nanotubes" because of their nanometer-scaled dimensions—typical diameters of nanotubes range from less than one nanometer to 50 nm, with lengths substantially greater than the tube diameter. Sumio Iijima's article "Carbon Nanotubes," *MRS Bulletin*, pp. 43–49 (11/94), the teachings of which are incorporated herein by reference, provides a primer on carbon nanotubes. If so desired, the catalyst used in this embodiment may consist essentially of carbon nanotubes.

The amount of catalyst used in the nanocrystalline powder can be varied within a relatively broad range. For example, the catalyst may comprise anywhere from 0.1 to 5 bulk weight percent of the particles. Desirably, the catalyst ranges from 0.5 to 4.5 bulk weight percent, with a preferred range of 1 to 4 bulk weight percent.

Conventional metal hydrides with catalysts are produced by coating the bulk particles. For example, in one conventional production process, a catalyst will be dissolved in THF, an organic solvent. The solvent will then be evaporated, leaving the catalyst behind. This process may lead to undesirable agglomeration and/or contamination of the powder. At least as importantly, however, it is expected that intercalating a catalyst in accordance with this embodiment of the present invention will yield better results than simply coating the exterior of the particle.

In one embodiment of the invention, the catalyst is intercalated into the particle rather than sitting only on the particle surface. The catalyst is desirably both present on the external surfaces of the particles and intercalated within the particles. It is expected that the catalyst will not be embedded within an individual crystal in the particle. Instead, it is expected that the catalyst will be present between the crystals, such as at a grain boundary or other junction between the crystals. It should be recognized that not every single particle must have the catalyst both on its surface and within the particle. As a matter of fact, at the lower end of the range of anticipated catalyst weight percentages, a number of particles in the powder may not have any catalyst at all. Generally, though, at least some of the particles will have catalyst both on the exterior of the particle and within the body of the particle. The catalyst is desirably both on and within a majority of the particles. Providing the catalyst both on and within substantially all of the particles is expected to lead to better homogeneity and more effective utilization of the catalyst.

Another embodiment of the invention provides a method of making a hydrogen storage medium. This method is particularly well adapted to produce a nanocrystalline catalyzed aluminum alloy powder. In accordance with this method, a milling charge is created by adding powdered aluminum and a powder of a second metal M in a predetermined atomic ratio. The second metal may be selected from the group consisting of lithium; sodium; magnesium; zirconium; alloys of two or more of lithium, sodium, magnesium, and zirconium; and a mechanical mixture of two or more of lithium, sodium, magnesium, and zirconium. In one embodiment, the second metal consists essentially of lithium, sodium, magnesium, or zirconium.

This charge of Al and M powders is milled to create a nanocrystalline alloy powder comprising crystals of $MAl_x$, wherein x is between 0.9 and 1.1 for each atom of M which is lithium or sodium, and x is between 1.8 and 2.2 for each atom of M which is magnesium or zirconium. By way of example, if the second metal comprised 50 percent lithium and 50 percent sodium, x would be between 0.9 and 1.1, i.e., the formula can be stated as $Li_{0.5}Ni_{0.5}Al_{0.9-1.1}$. By way of contrast, if the second metal M were 50 percent lithium and 50 percent magnesium, x would be determined by the formula x=0.5(0.9 to 1.1)+0.5(1.8 to 2.2), giving a value of x=1.35 to 1.65, yielding a formulation of $Li_{0.5}Mg_{0.5}Al_{1.35-1.65}$. Preferably, x is approximately equal to 1 for each atom of M which is lithium or sodium and approximately equal to 2 for each atom of M which is magnesium or zirconium. This would simplify the exemplary formulations to $Li_{0.5}Na_{0.5}Al$ and $Li_{0.5}Mg_{0.5}Al_{1.5}$, which may be restated as $LiNaAl_2$ and $LiMgAl_3$, respectively. The atomic ratios of the powders in the charge should be selected to correspond to the atomic ratios in the desired alloy.

The charge should be milled to a sufficient extent to take the two starting powders and create the desired alloy. This can be done by high-energy ball milling, for example. The variables which will determine the degree of alloying and the extent of comminution resulting from the milling process include the speed of the ball mill; the ratio of the weight of the milling media (e.g., balls or rods) to the weight of the powder; time of milling; the atmosphere within the ball milling chamber; and the temperature at which milling takes place. These variables can be altered as necessary to achieve the desired end result and to move the process from a relatively small bench-top operation to a larger commercial scale. By way of example, though, it is expected that the following conditions will yield a suitable metal alloy having the desired particle size and crystal size: using a SPEX-8000 high-energy ball mill rotated at about 400 rpm; a weight ratio of media:metal powders (total weight of both powders) of 3:1 to 10:1; a milling time of 10–40 hours, preferably 25–35 hours if M is lithium or magnesium; an inert atmosphere such as nitrogen or, more preferably, argon; and ambient temperature, with a flow of forced air flowing about the ball milling container being useful to keep the container from reaching too high a temperature.

Once the nanocrystalline-alloyed powder is obtained, the catalyst may be added to the powder. The catalyst may be intercalated into the particles in any desired fashion. For example, the catalyst may be intercalated by either milling the catalyst or by an electrochemical process. If the catalyst is added to the powder by milling, the nanocrystalline powder resulting from the first milling process may be mixed with a suitable weight percentage of the desired catalyst and placed in a ball mill. The conditions of this ball milling should be less intense and continue for a shorter period of time than that used to create the original alloy powder. For example, if the same SPEX-8000 mill is operated at the same speed, using the same environment and temperature noted above, the media:powder weight ratio for intercalation may be closer to 0.5:1 to 1:1 and the milling time for intercalation may be reduced to about 2–6 hours. It is believed that this process will both cause the catalyst to stick to the external surface of some or all of the particles and drive some of the catalyst into the interior of some or all of the nanocrystalline alloy particles.

It is anticipated that the catalyst particle size and/or grain size (for crystalline catalysts) will play a significant role in achieving intercalation of the catalyst rather than merely coating of the catalyst on the surface of the particle. It is preferred that the catalyst have a relatively small particle size and crystal size. This may be achieved by subjecting the catalyst to high energy ball milling similar to that used to form the alloy powder. This pretreatment should be dome before the catalyst is added to the metal alloy powder for intercalation therein. While the catalyst may be amorphous, if the catalyst is crystalline, the average grain size of the catalyst crystals may average less than 100 nm, desirably less than 50 nm, and more preferably between about 2 and about 30 nm. Such a crystalline catalyst may form larger polycrystalline particles.

It is believed that the process of intercalating the catalyst into the polycrystalline alloy particles is facilitated by producing the nanocrystalline alloy via the high-energy milling process noted above. In particular, this milling process is believed to leave substantial residual stress in and between the individual crystals of the particles. This stress increases the energy at the grain boundaries and is expected to help drive the catalyst along the grain boundaries in the intercalation step. If the catalyst has also been subjected to a high-energy impact milling before being added to the alloy powder, this will further add to the residual stress level in the combined powders and is expected to yield even better intercalation.

It may not be necessary to subject the catalyst to a separate initial impact milling step if the catalyst is of a suitable size already. This is expected to be one of the meaningful advantages of utilizing carbon fullerenes as the catalyst. Fullerenes have very small particle sizes. Carbon nanotubes, for example, have diameters which can be less than 1 nm. Since fullerenes innately have small particle sizes, they should be particularly well suited for intercalation into the alloy particles in accordance with this embodiment of the invention. Carbon nanotubes in particular are well adapted for hydrogen storage applications in their own right. It is anticipated that the nanotubes may retain some of this hydrogen storage character and both serve as a catalyst for the formation of aluminum alloy hydrides and provide surface area for adsorption of hydrogen.

As noted above, an alternative embodiment of the invention utilizes an electrochemical process to intercalate the catalyst into the particles. In this embodiment, a supply of the catalyst and a supply of the powder may be placed separately in an electrochemical solution. It is anticipated that a variety of commonly known non-aqueous, ion-conductive polymer solutions would suffice as the electrolyte. The nanocrystalline alloy powder will remain as a powder. It can be inserted into the electrolyte by placing it in an electrically conductive enclosure with a very fine mesh size to admit the electrolyte solution into contact with the powder. The catalyst electrode may also be a powder. More conveniently, however, it may comprise a solid block or rod of the element or elements comprising the catalysts. For example, the catalyst may take the form of palladium and/or platinum wires.

The electrically conductive container within which the alloy powder is placed and the cathode, which carries the catalyst, may be placed in the electrolyte solution and an electrical potential may be applied between these two electrodes. The catalyst will serve as the anode and the nanocrystalline alloy powder will serve as the cathode, essentially electroplating the catalyst onto the alloy particles. In a conventional process, this may leave the catalyst isolated solely at the surface of the particles. As noted above, producing the nanocrystalline powder by high-impact milling leaves substantial residual stress in the particles. It is anticipated that this significant residual stress will facilitate propagation of the catalyst along the grain boundaries to intercalate the catalyst within the interior of the particles.

Another embodiment of the present invention provides a metal hydride suitable for reversible hydrogen storage having the formula $MAl_{x-y}M'_yH_4$. In this formula, M comprises a metal selected from the group consisting of sodium, lithium, magnesium, and zirconium. M' comprises an element selected from the group consisting of silicon, potassium, calcium, barium, titanium, lithium, sodium, magnesium, and zirconium. X is preferably between 0.9 and 1.1 if M is sodium or lithium, with a range of 0.95 and 1.05 being desirable; a value for x of approximately 1 is preferred. If M is magnesium or zirconium, the value of x is desirably between 1.8 and 2.2, more desirably between 1.9 and 2.1 and preferably approximately 2. The value of y can be varied between 0.1 and 0.5, with a narrower range of 0.2 to 0.3 being preferred.

Comparison of the list of metals M and M' will highlight that all of the metals M are suitable for use as the other component M'. It should be understood, however, that M and M' should be different from one another. If M is sodium for example, M' may be selected from the narrower group of silicon, potassium, calcium, barium, titanium, lithium, magnesium, and zirconium.

It may be noted that the catalysts in the previous embodiment may be intercalated in the nanocrystalline particles of the alloy. The present embodiment is different in that the material M' is expected to actually form a part of the crystal itself and is desirably a true alloy, i.e., in a solid solution with the other components of the alloy.

The metal hydride in accordance with this embodiment of the invention may be manufactured in a manner very similar to that described above in connection with the preceding embodiment. In particular, an aluminum powder and a second powder may be charged into an impact mill. The second powder may comprise separate constituents of a powdered metal M and a powder of M'. As so desired, though, the metal M may be alloyed with the material M' in advance. Particularly if the value of the number y is relatively low, this may prove to be an effective way of maintaining product quality from one batch to the next. This charge is subjected to the same kind of high-energy impact milling explained above. If so desired, the media:powder weight ratio may be increased beyond the 10:1 ratio noted above and/or the milling time may be increased beyond the 40-hour time frame suggested above. If so desired, this milled metal alloy powder may be a nanocrystalline powder having particles no larger than one micron in average size, preferably no larger than 100 nm in average size, and comprising one or more crystals having an average grain size of less than 100 nm preferably no more than about 50 nm.

The high energy ball milling approach in accordance with this embodiment of the invention is believed to be particular advantageous in that it can create alloys which may not be readily formed by more conventional techniques. In particular, one may produce an alloy of the formula $MAl_{x-y}M'_y$, which is only a meta-stable alloy in a thermodynamic sense. This reduced thermodynamic stability is believed to make the reaction kinetics much more favorable to absorbing and releasing to hydrogen than are the more thermodynamically stable alloys LiAl, NaAl, $MgAl_2$, and $ZrAl_2$.

Once a metal alloy powder of the specified formula has been produced, it may be treated with hydrogen to form a metal hydride. It may be desirable to add a catalyst to this alloy before it is employed as a hydrogen storage medium, though. In a further aspect of this invention, therefore, the $MAl_{x-y}M'_y$ alloy is treated with a catalyst. The alloy powder may be coated only on the outside with a catalyst in accordance with conventional techniques. More preferably, though, the catalyst is intercalated into these alloy particles, e.g., by impact milling the alloy with a catalyst or using the electric chemical process outlined above.

Still another embodiment of the invention provides a metal alloy, suitable for reversible hydrogen storage, having the formula $M_{1-y}M'_yAl_x$. This metal alloy may be adapted to absorb hydrogen to form the metal hydride $M_{1-y}M'_yAl_xH_4$. In these formulae, M comprises a metal selected from the group consisting of sodium, lithium and magnesium. M' comprises an element selected from the group consisting of silicon, potassium, calcium, barium, titanium, lithium, sodium, magnesium, and zirconium. Again, it should be noted that the list of M' elements includes the list of M metals, but it should be understood that M and M' should be different from one another. The value of x in this formula is between 0.9 and 1.1 if M is sodium or lithium, preferably between about 0.95 and 1.05, and more preferably about 1. If M is instead magnesium, x may be between 1.8 and 2.2, desirably between about 1.9 and 2.1 and preferably about 2.0. y in this formulation may vary between 0.1 and 0.5, with a range of 0.2 to 0.3 being preferred.

Although various embodiments of the present invention have been described in detail, it should be recognized that this is solely for purposes of illustration and example. Various changes and modifications to these illustrative embodiments may be made without departing from the spirit and scope of the present invention, which is to be limited only by the following claims.

What is claimed is:

1. A nanocrystalline powder comprising polycrystalline particles containing crystals of an aluminum alloy and an extracrystalline catalyst present on and in the particles, the aluminum alloy being selected from the group consisting of $NaAl_x$, $LiAl_x$, $MgAl_{2x}$, and $ZrAl_{2x}$, wherein $0.9<x<1.1$, and the catalyst being selected from the group consisting of carbon, titanium, platinum, palladium, vanadium, zirconium, cobalt, nickel, iron, lanthanum, and combinations of two or more of carbon, titanium, platinum, palladium, vanadium, zirconium, cobalt, nickel, iron, and lanthanum.

2. The nanocrystalline powder of claim 1 wherein the aluminum alloy crystals have a grain size of no more than 100 nm.

3. The nanocrystalline powder of claim 1 wherein the aluminum alloy consists essentially of $NaAl_x$.

4. The nanocrystalline powder of claim 1 wherein the aluminum alloy consists essentially of $LiAl_x$.

5. The nanocrystalline powder of claim 1 wherein the aluminum alloy consists essentially of $MgAl_{2x}$.

6. The nanocrystalline powder of claim 1 wherein the aluminum alloy consists essentially of $ZrAl_{2x}$.

7. The nanocrystalline powder of claim 1 wherein x is between 0.95 and 1.05.

8. The nanocrystalline powder of claim 1 wherein the catalyst comprises no more than 5 bulk weight percent of the particles.

9. The nanocrystalline powder of claim 1 wherein the catalyst is carbon.

10. The nanocrystalline powder of claim 1 wherein the catalyst comprises a fullerene structure consisting essentially of carbon.

11. A nanocrystalline powder comprising polycrystalline particles containing crystals consisting essentially of an aluminum alloy selected from the group consisting of $NaAl_x$, $LiAl_x$, $MgAl_{2x}$, and $ZrAl_{2x}$, wherein $0.9<x<1.1$, the crystals having a grain size of no more than 100 nm, the particles further comprising an intercalated catalyst selected from the group consisting of carbon, titanium, platinum, palladium, vanadium, zirconium, cobalt, nickel, iron, lanthanum, and combinations of two or more of carbon, titanium, platinum, palladium, vanadium, zirconium, cobalt, nickel, iron, and lanthanum.

12. The nanocrystalline powder of claim 11 wherein the catalyst comprises no more than 5 bulk weight percent of the particles.

13. The nanocrystalline powder of claim 11 wherein the catalyst comprises a fullerene structure consisting essentially of carbon.

14. The nanocrystalline powder of claim 11 wherein the catalyst is carbon.

15. The nanocrystalline powder of claim 11 wherein the aluminum alloy comprises $NaAl_x$ and the catalyst comprises carbon, the carbon being present on and within the polycrystalline particles.

16. The nanocrystalline powder of claim 11 wherein the aluminum alloy comprises $LiAl_x$ and the catalyst comprises carbon, the carbon being present on and within the polycrystalline particles.

17. The nanocrystalline powder of claim 11 wherein the aluminum alloy comprises $MgAl_{2x}$ and the catalyst comprises carbon, the carbon being present on and within the polycrystalline particles.

18. The nanocrystalline powder of claim 11 wherein the aluminum alloy comprises $ZrAl_{2x}$ carbon, the carbon being present on and within the polycrystalline particles.

19. A nanocrystalline powder comprising polycrystalline particles containing a carbon catalyst and alloy crystals consisting essentially of an aluminum alloy selected from the group consisting of $NaAl_x$, $LiAl_x$, $MgAl_{2x}$, and $ZrAl_{2x}$, wherein $0.9<x<1.1$, an 100 nm.

20. The nanocrystalline powder of claim 19 wherein the carbon catalyst comprises no more than 5 bulk cent of the particles.

21. A method of forming a hydrogen storage medium comprising:

providing a charge comprising powdered Al and a powder of a second metal M in a predetermined atomic ratio, the second metal being selected from the group consisting of lithium; sodium; magnesium; zirconium; alloys of two or more of lithium, sodium, magnesium, and zirconium; and mechanical mixtures of two or more of lithium, sodium, magnesium, and zirconium;

impact milling the charge to create a nanocrystalline alloy powder comprising crystals of $MAl_x$, wherein x is between 0.9 and 1.1 for each atom of M which is lithium or sodium and x is between 1.8 and 2.2 for each atom of M which is magnesium or zirconium;

intercalating a catalyst into particles of the alloy powder, the catalyst being selected from the group consisting of carbon, titanium, platinum, palladium, vanadium, zirconium, cobalt, nickel, iron, lanthanum, and combinations of two or more of carbon, titanium, platinum, palladium, vanadium, zirconium, cobalt, nickel, iron, and lanthanum.

22. The method of claim 21 wherein the catalyst is intercalated by impact milling the nanocrystalline alloy powder with a powder comprising the catalyst.

23. The method of claim 22 wherein the catalyst powder consists essentially of carbon.

24. The method of claim 22 wherein the catalyst powder comprises a fullerene structure consisting essentially of carbon.

25. The method of claim 21 wherein the catalyst is intercalated by placing the nanocrystalline alloy powder and an electrode comprising the catalyst in an electrolyte and applying an electrical potential between the catalyst electrode and the nanocrystalline alloy powder to electrodeposit the catalyst on the powder.

26. A metal hydride suitable for reversible hydrogen storage of the formula $MAl_{x-y}M'_yH_4$ wherein:

M comprises a metal selected from the group consisting of sodium, lithium, magnesium, and zirconium;

M' comprises an element selected from the group consisting of silicon, potassium, calcium, barium, titanium, lithium, sodium, magnesium, and zirconium;

x is between 0.9 and 1.1 if M is sodium or lithium and x is between 1.8 and 2.2 if M is magnesium or if M is zirconium; and y is between 0.1 and 0.5.

27. The metal hydride of claim 26 wherein M' comprises carbon.

28. The metal hydride of claim 26 wherein x is 1 if M is sodium or lithium and x is 2 if M is magnesium.

* * * * *